Patented Nov. 21, 1950

2,531,190

UNITED STATES PATENT OFFICE 2,531,190

EMULSIFIER CONSISTING OF ALKYLOL-AMINE - FATTY ACID CONDENSATION PRODUCTS AND ESTERS OF POLYGLYCOLS

Oscar J. Ackelsberg, Caldwell, N. J., assignor to E. F. Drew & Co., Inc., New York, N. Y., a corporation of Delaware No Drawing. Application November 12, 1946, Serial No. 709,100

7 Claims. (Cl. 252—357)

The present invention is directed to emulsifying agents, more particularly to a type which includes condensation products of alkylolamine and caboxy acids.

Such condensates have been known for a number of years and have found an important use in industry. Such compounds are described in patents issued in the name of Kritchevsky Reissue No. 21,530, dated August 13, 1940, and No. 2,089,212, dated August 10, 1937. Generally the products described in said patents are made by condensing 1 mol. of a fatty acid or mixture of fatty acids, with 1 or 2 mols. of d ethanolamine or the like, whereby water is sp it off and the condensation products are dispersible in water. The mixture is heated to temperatures above 100° C. up to 300° C. and preferably between 135° C. and 210° C. for a period up to 20 hours or more to cause condensations to take place forming complex compounds, the structures of which are not fully known.

In a co-pending application of the present applicant and James E. Taylor, entitled Emulsifying Agent and Method of Making the Same, Serial No. 701,394, filed October 5, 1946, there is described a modification wherein fatty acids are condensed with alkylolamines in the ratio of 1.1 to 1.7 mols. of alkylolamines to 1 mol. of fatty acid. The mixture is rapidly heated to the reaction temperature of 150°–155° C. and maintained at said temperature for at least five to six hours until the free fatty acid value has dropped to between 5 and 16%. Condensation products of this type have been found to be considerably more effective for many uses. However, it is highly desirable that the condensation products be still more effective, particularly when used in hard water or in sea water as an emulsifying agent for various organic compounds usually dissolved in organic solvents.

In view of the above, it is among the objects of the present invention to provide emulsifying agents which are of the alkylolamine carboxy acid condensation product type and similar compositions which have greater efficiency as emulsifying agents than those of the prior art.

It is also among the objects of the present invention to provide a composition which contains the aforesaid type of condensation product and which provides emulsions of various substances in water having a greater stability of emulsion for a longer time.

It is further among the objects of the present invention to provide emulsifying agents which produce stable emulsions in soft water, tap water, hard water and sea water.

In practicing the present invention, there is provided a condensation product of the type described above, a relatively small proportion of which is added to an ester which is the reaction product of a high molecular weight polyalkylene glycol and higher fatty acids. The condensation products are made with from 1 to 2 mols. (i. e. 1–2 mols.) of the alkylolamine to 1 mol. of the carboxy acid. The acids are mono-carboxy and have a carbon atom content of from 6 to 20. The acids may be saturated or unsaturated and single acids or mixtures of acids may be used to form the condensation products. The method of making said condensation products follows the usual procedure as set forth in the above mentioned patents and application for patent.

The glycol esters which are used in conjunction with said condensation products are made with polyalkylene glycols having relatively high molecular weights ranging from about 200 to 4000. The acids used are mono-carboxy fatty acids having from 6 to 20 carbon atoms, being either saturated or unsaturated, and mixtures of said acids may be esterified with the aforesaid glycols. In those esters where the lower molecular weight glycols are used, the esterification may be conducted so as to preferably produce mono-esters. Where the higher range of molecular weight glycols are used, the esterification may be conducted usually to produce the di-esters. The esterification process may be accomplished by the standard procedures and the products may be refined as usual.

The mixtures of the present invention contain at least 75% of the ester and less than 25% of the condensation product. It has been found that compositions containing about 1 to 15% of the condensation product give emulsifying agents having excellent properties, and compositions containing 5% thereof have been found eminently suitable for many purposes. Such compositions have far greater emulsifying effectiveness than equal amounts of either of the constituents used separately.

The following are specific examples of the operation of the present invention.

Example 1

There is produced the mono-laurate of a polyethylene glycol having a molecular weight of about 400. 94% of said ester is incorporated with 6% of a condensation product which is made from 1.17 mols. of diethanolamine and 1 mol. of a mixture of free fatty acids derived from coconut oil having the following approximate composition.

| | Per cent |
|---|---|
| Capric and caprylic | 3–5 |
| Lauric | 88–92 |
| Myristic, palmitic, stearic, oleic and linoleic | 1–8 |

Said condensation product has a free fatty acid content of 5.7 to 11.3% compared to oleic acid.

Example 2

There is provided the mono-oleate of a polyethylene glycol having a molecular weight of about 600. 95% of this ester is mixed with 5% of a condensation product made from 1.48 mols. of diethanolamine with 1 mol. of oleic acid. Said condensation product has a free oleic acid content of between 6.7 and 12.3%.

Example 3

There is provided the mono-laurate of a polyethylene glycol having a molecular weight of about 600. 88% of said ester is mixed with 12% of a condensation product of 1.16 mols, of diethanolamine to 1 mol. of a mixture of fatty acids having approximately the following composition.

| | Per cent |
|---|---|
| Capric and caprylic | 4.3 |
| Lauric | 49.7 |
| Myristic | 21.0 |
| Palmitic, stearic, oleic and linoleic | 25.0 |

The condensation is conducted until the free fatty acid content of the mixture is between 5 and 7.7% compared to oleic acid. The lauric acid constitutes approximately 50% of the mixture of fatty acids in the condensation product and is the major constituent.

Example 4

There is provided a distearate of a polyethylene glycol having a molecular weight of about 1500. 82% of said ester is mixed with 18% of a condensation product made from 1.17 mols. of diethanolamine and 1 mol. of lauric acid.

Example 5

There is provided the mixed diesters of the following mixture of fatty acids.

| | Per cent |
|---|---|
| Capric and caprylic | 4.3 |
| Lauric | 49.7 |
| Myristic | 21.0 |
| Palmitic, stearic, oleic and linoleic | 25.0 |

Said mixture of fatty acid is esterified with sufficient of a polyethylene glycol having a molecular weight of about 200 so as to form a substantially neutral product. 85% of said ester is mixed with 15% of a condensation product of 1 mol. of the mixed fatty acids obtained by the hydrolysis of coconut oil but said mixed fatty acids being substantially all of the fatty acids initially present in the oil and in approximately the original proportions. The condensation product is formed by mixing said fatty acids with 2 mols. of monoethanolamine and heating it at a sufficiently high temperature for a sufficient time to form a condensation product.

Example 6

There is provided the diesters of the following mixture of fatty acids.

| | Per cent |
|---|---|
| Capric and caprylic | 3–5 |
| Lauric | 88–92 |
| Myristic, palmitic, stearic, oleic and linoleic | 1–8 |

Said mixture has a free fatty acid content of 139 to 142% based on oleic acid. It is esterified with a polyalkylene glycol having a molecular weight of about 4000 and the operation is conducted until substantially neutral mixed esters of said glycol are obtained. A mixture is made containing 97% of said ester and 3% of a condensation product formed by the reaction of 1 mol. of monoethanolamine with 1 mol. of stearic acid at a sufficient temperature for a sufficient time to form a condensation product having emulsifying properties.

Compositions such as are illustrated by Examples 1 to 6 have been found quite efficient as emulsifying agents for various substances. For instance, in the case of DDT (dichlordiphenyl-trichlor ethane) solutions in aromatic hydrocarbons such as the methylated aromatic hydrocarbons, compositions of the present invention have been found extremely suitable under substantially all conditions of use. For instance, when such DDT solutions were mixed with 6% of a prior art emulsifying agent, such as the condensation products described herein per se, in a specified dilution in water, the settling time of the DDT was about two hours. In a parallel experiment utilizing 6% of a composition of the present invention, the settling time was raised to 48 hours.

Compositions of the present invention are excellent for many types of emulsions and they may be applied generally in the arts where emulsions of organic substances in water are desired. It is of extreme importance that emulsions made with the present compositions are stable in various types of water including extremely hard water and sea water. The compositions are far more effective than equivalent amounts of the individual ingredients when used separately.

Although the invention has been described setting forth several specific embodiments thereof, it will be apparent to those skilled in the art that various changes in the details of the invention may be made within the spirit thereof. For instance, the fatty acids used either in the condensation products or in the esters may be obtained from a different source than coconut oil. Other fatty acids derived from glyceride oils may be used such as from fish oils, animal oils or vegetable oils. The acids so used may be saturated or unsaturated. They may be derived from natural or synthetic sources, they may have odd numbers of carbon atoms as well as even numbers, and they may be branched chain compounds. The lauric acid or lauric acid mixtures or any of the other acids may be derived from oils other than coconut oil, such as palm kernel oil, babassu oil and the like. Either pure acids may be used or such acids may contain minor proportions of other acids within the scope of the disclosure. All these are included in the term "fatty" acid used in the claims.

The compositions may contain not only mono-esters or di-esters but mixtures of the same. Other polyglycols having the specified molecular weights may be used, such as the polypropylene or polybutylene glycols. Also mixtures of polyglycols may be utilized in the making of the described esters. Also, other alkylolamines may be substituted for those specifically described, it being desirable that the alkyl groups of such compounds have a carbon content of between 2 and 10 carbon atoms.

It is feasible to form the esters by reacting the fatty acid with an alkylene oxide, such as ethylene oxide, whereby the polyglycol formation and esterification are caused to take place simultaneously. One may react the fatty acid with a glycol (or a polyglycol of lower molecular weight than desired); then the initial product may be reacted with a suitable alkylene oxide to build up the glycol radical to the desired molecular weight. Other methods of forming the products may be used.

From the above description, it will be apparent that numerous combinations may be made in producing the compositions of the present invention. Among them are mixtures in which the principal or sole acid constituent of the condensation product is lauric, oleic or stearic acid; and similarly, the principal or sole acid constituent of the ester may be lauric, oleic or stearic acid. In these instances other fatty acids totally less than 50% of the acids may partially replace lauric, oleic and stearic acid. But the invention is not limited thereto.

These and other changes may be made in the details of the invention, which is to be broadly construed and not to be limited except by the character of the claims appended hereto.

I claim:

1. Emulsifying compositions consisting essentially of 75% to 99% of the mono-ester of a polyalkylene glycol having a molecular weight of 200 to 4000 with a fatty acid having from 6 to 20 carbon atoms, mixed with 1 to 25% of the reaction product of a dialkylolamine having 2 to 10 carbon atoms in the alkyl group, and a fatty acid having 6 to 20 carbon atoms, said latter product consisting essentially of amides and esters of fatty acids having 6 to 20 carbon atoms and unesterified fatty acid to the extent of 5% to 12.3%, in the molar ratio of 1-2 of alkylolamine to 1 of acid.

2. Emulsifying compositions consisting essentially of 85% to 99% of the mono-ester of a polyalkylene glycol having a molecular weight of 200 to 4000 with a fatty acid having from 6 to 20 carbon atoms, mixed with 1 to 15% of the reaction product of a dialkylolamine having 2 to 10 carbon atoms in the alkyl group, and a fatty acid having 6 to 20 carbon atoms, said latter product consisting essentially of amides and esters of fatty acids having 6 to 20 carbon atoms and unesterified fatty acid to the extent of 5% to 12.3%, in the molar ratio of 1-2 of alkylolamine to 1 of acid.

3. Emulsifying compositions consisting essentially of 75% to 99% of the mono-ester of a polyalkylene glycol having a molecular weight of 200 to 4000 with a fatty acid having from 6 to 20 carbon atoms, mixed with 1 to 25% of the reaction product of a dialkylolamine having 2 to 10 carbon atoms in the alkyl group, and a fatty acid having 6 to 20 carbon atoms, said latter product consisting essentially of amides and esters of a mixture of fatty acids of coconut oil and unesterified fatty acid to the extent of 5% to 12.3%, in the molar ratio of 1-2 of alkylolamine to 1 of acid.

4. Emulsifying compositions consisting essentially of 75% to 99% of the mono-ester of a polyalkylene glycol having a molecular weight of 200 to 4000 with a fatty acid having from 6 to 20 carbon atoms, mixed with 1 to 25% of the reaction product of a dialkylolamine having 2 to 10 carbon atoms in the alkyl group, and a fatty acid having 6 to 20 carbon atoms, said latter product consisting essentially of amides and esters of a mixture of fatty acids of coconut oil in which lauric acid is the major constituent and unesterified fatty acid to the extent of 5% to 12.3%, in the molar ratio of 1-2 of alkylolamine to 1 of acid.

5. Emulsifying compositions consisting essentially of 75% to 99% of the mono-ester of a polyalkylene glycol having a molecular weight of 200 to 4000 with a fatty acid having from 6 to 20 carbon atoms, mixed with 1 to 25% of the reaction product of a dialkylolamine having 2 to 10 carbon atoms in the alkyl group, and a fatty acid having 6 to 20 carbon atoms, said latter product consisting essentially of amides and esters of an acid taken from the class consisting of lauric, stearic and oleic and unesterified fatty acid to the extent of 5% to 12.3%, in the molar ratio of 1-2 of alkylolamine to 1 of acid.

6. Emulsifying compositions consisting essentially of 75% to 99% of the mono-ester of a polyalkylene glycol having a molecular weight of 200 to 4000 with a fatty acid having from 6 to 20 carbon atoms, mixed with 1 to 25% of the reaction product of a dialkylolamine having 2 to 10 carbon atoms in the alkyl group, and a fatty acid having 6 to 20 carbon atoms, said latter product consisting essentially of amides and esters of fatty acids having 12 to 18 carbon atoms and unesterified fatty acid to the extent of 5% to 12.3%, in the molar ratio of 1-2 of alkylolamine to 1 of acid.

7. Emulsifying compositions consisting essentially of 75% to 99% of the mono-ester of a polyethylene glycol having a molecular weight of 200 to 4000 with a fatty acid having from 6 to 20 carbon atoms, mixed with 1 to 25% of the reaction product of diethanolamine, and a fatty acid having 6 to 20 carbon atoms, said latter product consisting essentially of amides and esters of fatty acids having 6 to 20 carbon atoms and unesterified fatty acid to the extent of 5% to 12.3%, in the molar ratio of 1-2 of alkylolamine to 1 of acid.

OSCAR J. ACKELSBERG.

REFERENCES CITED

The following references are of record in the file of this patent:

UNITED STATES PATENTS

| Number | Name | Date |
| --- | --- | --- |
| 2,173,909 | Kritchevsky | Sept. 26, 1939 |
| 2,206,090 | Haggenmacher | July 2, 1940 |
| 2,269,529 | Goldsmith | Jan. 13, 1942 |
| 2,362,894 | Epstein | Nov. 14, 1944 |